(12) United States Patent
Chauvel et al.

(10) Patent No.: US 7,840,784 B2
(45) Date of Patent: Nov. 23, 2010

(54) TEST AND SKIP PROCESSOR INSTRUCTION HAVING AT LEAST ONE REGISTER OPERAND

(75) Inventors: Gerard Chauvel, Antibes (FR); Serge Lasserre, Frejus (FR); Dominique D'Inverno, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 2016 days.

(21) Appl. No.: 10/632,084

(22) Filed: Jul. 31, 2003

(65) Prior Publication Data

US 2004/0153885 A1    Aug. 5, 2004

Related U.S. Application Data

(60) Provisional application No. 60/400,391, filed on Jul. 31, 2002.

(30) Foreign Application Priority Data

Jul. 30, 2003    (EP) .................................. 03291911

(51) Int. Cl.
*G06F 9/32* (2006.01)
(52) U.S. Cl. ...................... 712/220; 712/226
(58) Field of Classification Search .................. 714/30; 712/223; 708/533
See application file for complete search history.

(56) References Cited

U.S. PATENT DOCUMENTS 4,003,033 A * 1/1977 O'Keefe et al. ............. 710/107
4,028,668 A * 6/1977 Riikonen ........................ 710/9
4,038,537 A * 7/1977 Cassarino et al. ........... 714/805
4,314,350 A * 2/1982 Toy .............................. 708/533

(Continued)

FOREIGN PATENT DOCUMENTS

EP    0 079 995 A    6/1989

OTHER PUBLICATIONS

*Embedded JAVA*, Vincent Perrier, Aug. 15, 2001, (3 p.); Online http://www.onjava.com/pub/a/onjava/synd/2001/08/15/embedded.html.

*Primary Examiner*—Eric Coleman
(74) *Attorney, Agent, or Firm*—Ronald O. Neerings; Wade James Brady, III; Frederick J. Telecky, Jr.

(57) ABSTRACT

A processor may execute a test and skip instruction that includes or otherwise specifies at least two operands that are used in a comparison operation. Based on the results of the comparison, the instruction that follows the test and skip instruction is "skipped." The test and skip instruction may specify that the operands used in the comparison include (1) the contents of two registers, (2) the contents of one register and the contents of a memory location, or (3) the contents of one register and a stack value. In the second mode (an operand being from memory), a register is specified in the test and skip instruction that contains a value from which a pointer may be calculated. The calculated pointer preferably points to the memory location. If a stack value is used in the execution of the test and skip instruction, the instruction may include a reference to a register that points to the top of the stack. Further, the stack pointer may be adjusted automatically if the stack is used to provide an operand for the instruction. Embodiments may include apparatus and methods.

25 Claims, 2 Drawing Sheets

U.S. PATENT DOCUMENTS

| | | | |
|---|---|---|---|
| 4,873,627 A | 10/1989 | Baum | |
| 4,926,312 A * | 5/1990 | Nukiyama | 712/219 |
| 5,253,349 A * | 10/1993 | Kreitzer | 712/223 |
| 5,434,986 A * | 7/1995 | Kuslak et al. | 712/216 |
| 5,642,306 A * | 6/1997 | Mennemeier et al. | 708/625 |
| 5,644,759 A * | 7/1997 | Lucas et al. | 712/240 |
| 5,931,940 A | 8/1999 | Shelton | |
| 6,029,226 A * | 2/2000 | Ellis et al. | 711/100 |
| 6,047,366 A * | 4/2000 | Ohara et al. | 712/14 |
| 6,098,089 A | 8/2000 | O'Connor et al. | 709/104 |
| 6,567,905 B2 | 5/2003 | Otis | 711/170 |
| 6,571,260 B1 | 5/2003 | Morris | 707/206 |
| 6,880,074 B2 * | 4/2005 | Perry et al. | 712/248 |
| 6,988,187 B2 * | 1/2006 | Magoshi | 712/218 |
| 2002/0065990 A1 | 5/2002 | Chauvel et al. | 711/137 |
| 2002/0069332 A1 | 6/2002 | Chauvel et al. | 711/144 |
| 2003/0061464 A1 * | 3/2003 | Catherwood et al. | 712/35 |
| 2003/0101320 A1 | 5/2003 | Chauvel et al. | 711/154 |

\* cited by examiner

| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | PROGRAM COUNTER (PC) |
| R5 | GENERAL PURPOSE / LOCAL VARIABLE POINTER (LV) |
| R6 | STACK POINTER (SP) |
| R7 | TOP OF STACK (ToS) |
| R8 | GENERAL PURPOSE / ADDRESS INDEX 0 (AI0) |
| R9 | GENERAL PURPOSE / ADDRESS INDEX 1 (AI1) |
| R10 | GENERAL PURPOSE (GP) |
| R11 | GENERAL PURPOSE (GP) |
| R12 | MICRO-PROGRAM COUNTER (MICRO-PC) |
| R13 | GENERAL PURPOSE (GP) |
| R14 | GENERAL PURPOSE / INDIRECT REGISTER INDEX (IRI) |
| R15 | STATUS AND CONTROL (ST) |

*FIG. 4*

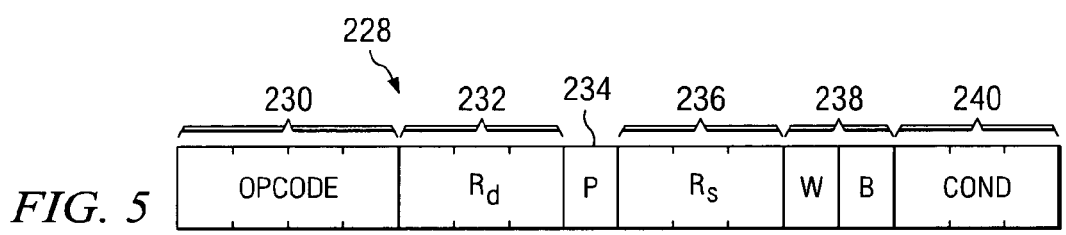

*FIG. 5*

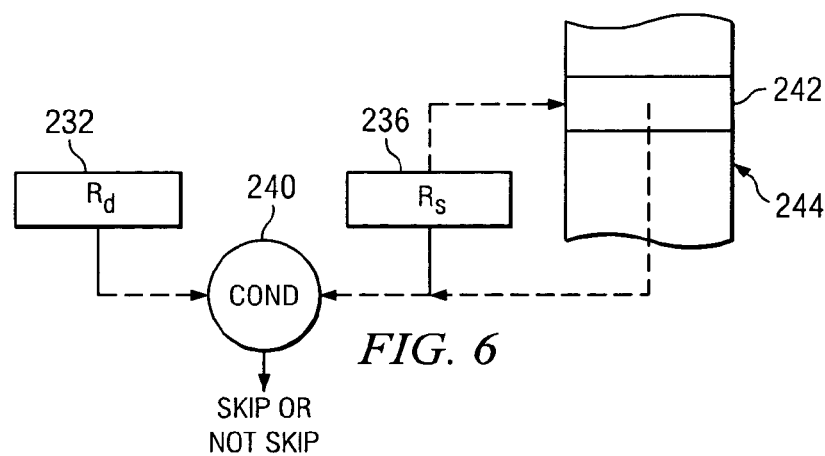

*FIG. 6*

TEST AND SKIP PROCESSOR INSTRUCTION HAVING AT LEAST ONE REGISTER OPERAND

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291911.0, filed Jul. 30, 2003 and entitled "Test And Skip Processor Instruction Having At Least One Register Operand," incorporated herein by reference. This application also may contain subject matter that may relate to the following commonly assigned co-pending applications incorporated herein by reference: "System And Method To Automatically Stack And Unstack Java Local Variables," Ser. No. 10/632,228, filed Jul. 31, 2003; "Memory Management Of Local Variables," Ser. No. 10/632,067, filed Jul. 31, 2003; "Memory Management Of Local Variables Upon A Change Of Context," Ser. No. 10/632,076, filed Jul. 31, 2003; "A Processor With A Split Stack," Ser. No. 10/632,079, filed Jul. 31, 2003; "Using IMP-DEP2 For System Commands Related To Java Accelerator Hardware," Ser. No. 10/632,069, filed Jul. 31, 2003; "Test With Immediate And Skip Processor Instruction," Ser. No. 10/632,214, filed Jul. 31, 2003; "Synchronizing Stack Storage," Ser. No. 10/631,422, filed Jul. 31, 2003; "Methods And Apparatuses For Managing Memory," Ser. No. 10/631,252, filed Jul. 31, 2003; "Write Back Policy For Memory," Ser. No. 10/631,185, filed Jul. 31, 2003; "Methods And Apparatuses For Managing Memory," Ser. No. 10/631,205, filed Jul. 31, 2003; "Mixed Stack-Based RISC Processor," Ser. No. 10/631,308, filed Jul. 31, 2003; "Processor That Accommodates Multiple Instruction Sets And Multiple Decode Modes," Ser. No. 10/631,246, filed Jul. 31, 2003; "System To Dispatch Several Instructions On Available Hardware Resources," Ser. No. 10/631,585, filed Jul. 31, 2003; "Micro-Sequence Execution In A Processor," Ser. No. 10/632,216, filed Jul. 31, 2003; "Program Counter Adjustment Based On The Detection Of An Instruction Prefix," Ser. No. 10/632,222, filed Jul. 31, 2003; "Reformat Logic To Translate Between A Virtual Address And A Compressed Physical Address," Ser. No. 10/632,215, filed Jul. 31, 2003; "Synchronization Of Processor States," Ser. No. 10/632,024, filed Jul. 31, 2003; "Conditional Garbage Based On Monitoring To Improve Real Time Performance," Ser. 10/631,195, filed Jul. 31, 2003; "Inter-Processor Control," Ser. No. 10/631,120, filed Jul. 31, 2003; "Cache Coherency In A Multi-Processor System," Ser. No. 10/632,229, filed Jul. 31, 2003; "Concurrent Task Execution In A Multi-Processor, Single Operating System Environment," Ser. No. 10/632,077, filed Jul. 31, 2003; and "A Multi-Processor Computing System Having A Java Stack Machine And A RISC-Based Processor," Ser. No. 10/631,939, filed Jul. 31, 2003.

BACKGROUND OF THE INVENTION

1. Technical Field of the Invention

The present invention relates generally to processors and more particularly to an executable instruction that is capable of testing two values and skipping or executing the subsequent instruction based on the result of the test.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY

As disclosed herein, a processor may execute a test and skip instruction that includes or otherwise specifies at least two operands that are used in a comparison operation. Based on the results of the comparison (e.g., whether a condition is true or not), the instruction that follows the test and skip instruction is "skipped." The test and skip instruction may specify that the operands used in the comparison include (1) the contents of two registers, (2) the contents of one register and the contents of a memory location, or (3) the contents of one register and a stack value. In the second mode (an operand being from memory), a register is specified in the test and skip instruction that contains a value from which a pointer may be calculated. The calculated pointer preferably points to the memory location. If a stack value is used in the execution of the test and skip instruction, the instruction may include a reference to a register that points to the top of the stack. Further, the stack pointer may be adjusted automatically if the stack is used to provide an operand for the instruction. Embodiments may include apparatus and methods.

Notation and Nomenclature

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections. "Skipping" an instruction means that the instruction, which may have already been fetched by the processor, is not permitted to complete through the processor's pipeline in favor of the instruction following the skipped instruction.

BRIEF DESCRIPTION OF THE DRAWINGS

For a more detailed description of the preferred embodiments of the present invention, reference will now be made to the accompanying drawings, wherein:

FIG. 4 shows various registers used in the JSM of FIGS. 1 and 3;

FIG. 5 shows an exemplary format of a test and skip instruction in accordance with the preferred embodiment of the invention; and FIG. 6 illustrates the operation of the test and skip instruction in accordance with various preferred embodiments.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor that executes various instructions including, without limitation, a test and skip processor instruction having at least one register operand. The following describes the operation of a preferred embodiment of a processor on which the test and skip instruction may run. Other processor architectures and embodiments may be available or developed on which to run the instruction and thus this disclosure and the claims which follow are not limited to any particular type of processor. Details regarding the format and operation of the test with immediate and skip instruction follow the description of the processor.

The processor described herein is particularly suited for executing Java™ bytecodes or comparable code. As is well known, Java is particularly suited for embedded applications. Java is a relatively "dense" language meaning that on average each instruction may perform a large number of functions compared to various other programming languages. The dense nature of Java is of particular benefit for portable, battery-operated devices that preferably include as little memory as possible to save space and power. The reason, however, for executing Java code is not material to this disclosure or the claims which follow. The processor described herein may be used in a wide variety of electronic systems. By way of example and without limitation, the Java-executing processor described herein may be used in a portable, battery-operated cell phone. Further, the processor advantageously includes one or more features that permit the execution of the Java code to be accelerated.

Figure 1:
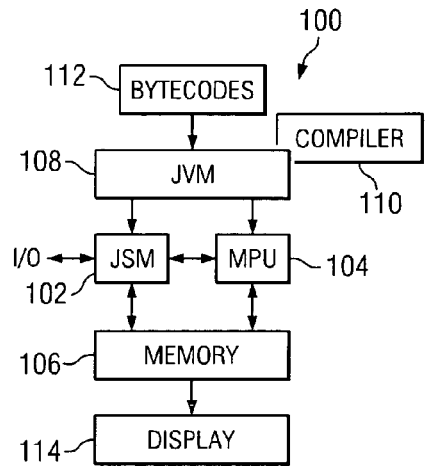
FIG. 1 shows a diagram of a system in accordance with preferred embodiments of the invention and including a Java Stack Machine ("JSM") and a Main Processor Unit ("MPU")
Figure 2:
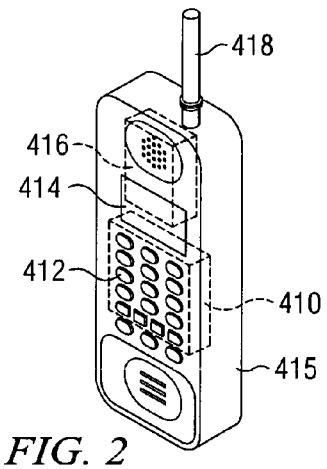
FIG. 2 illustrates an embodiment of the invention in the form of a wireless communication device.

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may include, without limitation, a battery and an analog transceiver to permit wireless communications with other devices. As noted above, while system 100 may be representative of, or adapted to, a wide variety of electronic systems, an exemplary electronic system may comprise a battery-operated, mobile cell phone such as that is shown in FIG. 2. As shown, a mobile communications device includes an integrated keypad 412 and display 414. Two processors and other components may be included in electronics package 410 connected to keypad 412, display 414, and radio frequency ("RF") circuitry 416 which may be connected to an antenna 418.

As is generally well known, Java code comprises a plurality of "bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java bytecodes. When appropriate, however, the JSM 102 may request the MPU 104 to execute one or more Java bytecodes not executed or executable by the JSM 102. In addition to executing Java bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

In accordance with preferred embodiments of the invention, the JSM 102 may execute at least two instruction sets. One instruction set may comprise standard Java bytecodes. As is well-known, Java is a stack-based programming language in which instructions generally target a stack. For example, an integer add ("IADD") Java instruction pops two integers off the top of the stack, adds them together, and pushes the sum back on the stack. As will be explained in more detail below, the JSM 102 comprises a stack-based architecture with various features that accelerate the execution of stack-based Java code.

Another instruction set executed by the JSM 102 may include instructions other than standard Java instructions. In accordance with at least some embodiments of the invention, such other instruction set may include register-based and memory-based operations to be performed. This other instruction set generally complements the Java instruction set and, accordingly, may be referred to as a complementary instruction set architecture ("C-ISA"). By complementary, it is meant that the execution of some more complex Java bytecodes may be substituted by "micro-sequences" using C-ISA instructions that permit an address calculation process to "walk through" the JVM data structures. Further, such micro-sequences may also use bytecode instructions. Further, Java execution may be made more efficient and run faster by replacing some sequences of Bytecodes by preferably shorter and more efficient sequences of C-ISA instructions. Bytecodes also may be used within a C-ISA sequence. The two sets of instructions may be used in a complementary fashion to obtain satisfactory code density and efficiency. As such, the JSM 102 generally comprises a stack-based architecture for efficient and accelerated execution of Java bytecodes combined with a register-based architecture for executing register and memory based C-ISA instructions. Both architectures preferably are tightly combined and integrated through the C-ISA.

Figure 3:
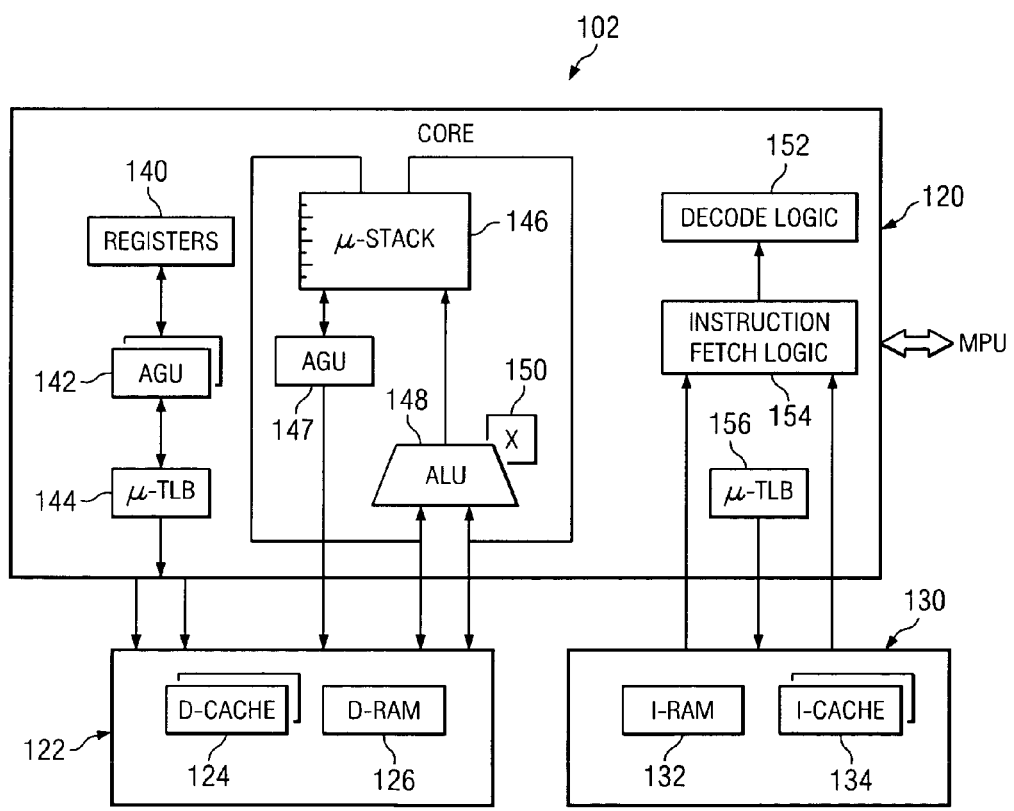
FIG. 3 shows a block diagram of the JSM of FIG. 1 in accordance with preferred embodiments of the invention.

FIG. 3 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146, processed by the ALU 148, while instructions may be fetched from instruction storage 130 by fetch logic 154 and decoded by decode logic 152. The address generation unit 142 may be used to calculate addresses based, at least in part on data contained in the registers 140. The AGUs 142 may calculate addresses for C-ISA instructions as will be described below. The AGUs 142 may support parallel data accesses for C-ISA instructions that perform array or other types of processing. AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104.

Referring now to FIG. 4, the registers 140 may include 16 registers designated as R0-R15. Registers R0-R3, R5, R8-R11 and R13-R14 may be used as general purposes ("GP") registers usable for any purpose by the programmer. Other registers, and some of the GP purpose registers, may be used for specific functions. For example, registers R4 and R12 may be used to store two program counters. Register R4 preferably is used to store the program counter ("PC") and register R12 preferably is used to store a micro-program counter ("micro-PC"). In addition to use as a GP register, register R5 may be used to store the base address of a portion of memory in which Java local variables may be stored when used by the current Java method. The top of the micro-stack 146 is reflected in registers R6 and R7. The top of the micro-stack has a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"), as will be explained below. Register R14 may also be used to hold the indirect register index ("IRI"). Register R15 may be used for status and control of the JSM 102. As an example, one status/control bit (called the "Micro-Sequence-Active" bit) may indicate if the JSM 102 is executing a "simple" instruction or a "complex" instruction through a "micro-sequence." This bit controls in particular, which program counter is used R4 (PC) or R12 (micro-PC) to fetch the next instruction. A "simple" bytecode instruction is generally one in which the JSM 102 may perform an immediate operation either in a single cycle (e.g., an "iadd" instruction) or in several cycles (e.g., "dup2_x2"). A "complex" bytecode instruction is one in which several memory accesses may be required to be made within the JVM data structures for various verifications (e.g., Null pointer, array boundaries). Because these data structures are generally JVM-dependent and thus may change from one JVM implementation to another, the software flexibility of the micro-sequence provides a mechanism for various JVM optimizations now known or later developed.

Referring again to FIG. 3, as noted above, the JSM 102 is adapted to process and execute instructions from at least two instruction sets. One instruction set includes stack-based operations and the second instruction set includes register-based and memory-based operations. The stack-based instruction set may include Java bytecodes. Java bytecodes pop, unless empty, data from and push data onto the micro-stack 146. The micro-stack 146 preferably comprises the top n entries of a larger stack that is implemented in data storage 122. Although the value of n may vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The second, register-based, memory-based instruction set may comprise the C-ISA instruction set introduced above. The C-ISA instruction set preferably is complementary to the Java bytecode instruction set in that the C-ISA instructions may be used to accelerate or otherwise enhance the execution of Java bytecodes. For example, the compiler 110 may scan a series of Java bytecodes 112 and replace one or more of such bytecodes with an optimized code segment mixing C-ISA and bytecodes and which is capable of more efficiently performing the function(s) performed by the initial group of Java bytecodes. In at least this way, Java execution may be accelerated by the JSM 102. The C-ISA instruction set includes a plurality of instructions including a test and skip instruction as mentioned above and explained below in detail.

Referring still to FIG. 3, the ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 generally comprises data cache ("D-cache") 124 and data random access memory ("D-RAMset") 126. Reference may be made to copending applications U.S. Ser. Nos. 09/591,537 filed Jun. 9, 2000, 09/591,656 filed Jun. 9, 2000, and 09/932,794 filed Aug. 17, 2001, all of which are incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAMset 132 may be used for "complex" micro-sequenced bytecodes or other micro-sequences or sequences of code, as will be described below. The I-cache 134 may be used to store other types of Java bytecode and mixed Java/C-ISA instructions.

As explained above, the C-ISA instruction set preferably permits register-based and memory-based operations. While not the only C-ISA instruction, as noted above one such instruction is the test and skip instruction which includes at least one register operand. An exemplary embodiment of this instruction is depicted in FIG. 5. The preferred embodiment of the test and skip instruction 228 comprises an opcode 230, a first register reference 232 (labeled generically as "Rd" in FIG. 5), an address program bit ("P") 234, a second register reference 236 ("Rs"), W and B bits 238, and a test condition 240.

The opcode 230 uniquely encodes a value that specifies the test and skip instruction as described herein. The opcode 230 is read by the decode logic 152 (FIG. 3). The first register reference Rd 232 preferably comprises three bits as shown and thus may reference any one of eight registers, for example, one of register R0-R7. The second register reference Rs 236 also preferably comprises three bits and thus also may reference one of eight registers such as registers R0-R7. Alternatively, the registers encoded in the Rd and Rs fields 232, 236 may include any other group of eight registers from registers 140 (FIG. 4). The P bit 234 generally dictates the type of addressing used for the instruction as explained below.

The test and skip instruction 228 preferably compares two operands to determine whether a condition is true. If the condition is true, then the instruction that follows the test and skip instruction 228 is "skipped." Skipping the next instruction means that the subsequent instruction, which may have already been fetched by fetch logic 154, is not permitted to complete through the processor's pipeline. Skipping the subsequent instruction may occur by replacing the instruction with a "no operation" (NOP) instruction which is permitted to complete but, by its nature, generally does nothing. Skipping the subsequent instruction may be performed in accordance with other ways as well, such as by flushing the subsequent instruction from the processor's pipeline.

The operands compared in accordance with the test and skip instruction 228 may be determined, at least in part, by the P bit 234. In accordance with at least some embodiments, one of the operands comprises the value stored in a register referenced by Rd 232. The second operand may be determined by the P bit 234. If the P bit 234 is set to a first value (e.g., "0"), the second operand preferably is the value stored in a register referenced by Rs 236. Accordingly, in this addressing mode (P bit set to a value of "0"), the contents of two registers are compared to each other. If, however, the P bit is set to a second value (e.g., "1"), the register referenced by Rs generally contains a pointer to a memory address. In this latter mode, the contents of a register are compared to a memory value pointed by another register. More specifically and in accordance with a preferred embodiment, the pointer to the memory location may be calculated by adding the contents of the register specified in the register reference 236 (Rs) to an implicit register (e.g., register R8) that stores an offset. The R8 register may be post-incremented by a suitable, predetermined value (e.g., 1) after the memory access to prepare the offset present in R8 for a subsequent access. Without limitation, this type of operation may be particularly useful when searching for a specific pattern in memory as in "code book searching." Accordingly, this test and skip instruction could be used within a software loop from a start address in memory.

FIG. 6 further illustrates the test and skip instruction. As shown, the contents of a register Rd 232 is compared either to the contents of a register Rs 236 or to a memory location 242 in memory 244 to which Rs points. In either case, the operands are compared by applying a condition 240 (specified in the instruction 228). The result of the comparison dictates whether the subsequent instruction is skipped.

Referring again to FIG. 5, the condition 240 used in the comparison preferably is specified as part of the instruction. The condition 240 may comprise three bits as shown, although in other embodiments fewer or more bits may be used to encode a condition. Alternatively, the condition may be implicit in the instruction itself. In accordance with the embodiment, the condition 240 may include equal to, not equal to, less than, or greater than. Other conditions may be encoded as well such as, and without limitation, greater than or equal to and less than or equal to.

The W and B bits 238 specify the size of the operands on which the comparison is performed. For example, the size encoded by the W and B bits may include byte, half word, or word. For example, with the W and B bits encoding a byte size, the lower eight bits of the operands are compared to each other. A half word size means that the lower half of the operand values are compared to each other, while a whole word size means that the entire operand values in their entirety are compared to each other.

Referring to FIGS. 4 and 5, in the event, the register referenced by Rd 232 is the top of stack register R7, the test and skip instruction 228 causes the comparison to be made between a register (Rd) and the top of the stack. In this case, the execution of instruction 228 may cause the stack pointer register R6 to be adjusted appropriately. That is, if the value at the top of the stack (e.g., the microstack 146) is used in the execution of the instruction, that top of stack value will be consumed. That being the case, the pointer to the top of the stack should be adjusted to point to the value that will subsequently represent the top of the stack. The adjustment to the stack pointer register R6 may be to decrement the stack pointer value by an appropriate amount (e.g., 1) depending on whether the stack management scheme is upwards or downwards based.

The test and skip instruction described herein provides a variety of benefits, none of which should be used to narrow the scope of this disclosure. That being stated, such benefits may include optimizing searches through arrays for a specific value, minimum/maximum calculation, etc. The test and skip instruction generally also improves the overall execution time of Java code. Further, the test and skip instruction 228 is generally relatively dense thereby permitting a Java application containing such instructions to require less memory storage space than otherwise would be needed.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For example, the format shown in FIG. 5 is directed to a 16-bit instruction. Other embodiments of the test and skip instruction may include a different number of bits and/or a different number of bits for each of the fields shown in FIG. 5. Moreover, the scope of protection is not limited by the description as set out above. Each and every claim is incorporated into the specification as an embodiment of the present invention.

What is claimed is:

1. A processor executing a plurality of instructions, comprising:

an arithmetic logic unit; and a plurality of registers coupled to the ALU, each register programmable to store a register value;

wherein said processor executes a test and skip instruction when called within the plurality of instructions that includes a first register reference and a second register reference and causes the processor to compare a first value comprising the register value stored in a register corresponding to the first register reference and a second value associated with the second register reference and to execute or not execute a subsequent instruction that follows the test and skip instruction based on the comparison.

2. The processor of claim 1 wherein the second value comprises a register value stored in the second register reference.

3. The processor of claim 1 wherein the processor is configured to access memory and the second value is stored in the memory.

4. The processor of claim 3 wherein the second register reference contains a value used to compute a pointer to a memory location containing the second value.

5. The processor of claim 4 wherein the pointer is computed by adding the value from the second register reference to a register value from another register.

6. The processor of claim 5 wherein the value held in the another register is post-incremented by a predetermined value following execution of the test and skip instruction.

7. The processor of claim 1 wherein the comparison includes a condition that is specified in the test and skip instruction.

8. The processor of claim 7 wherein any one of a plurality of conditions are specified in the test and skip instruction.

9. The processor of claim 7 wherein the condition is a condition selected from the group consisting of equal to, not equal to, less than, and greater than.

10. A method of executing a test and skip instruction, comprising:
    executing a sequence of instructions by a processor;
    calling the test and skip instruction within the sequence of instructions;
    examining a bit in the test and skip instruction;
    determining an address mode based on said bit; comparing contents of a first register to contents of a second register if the bit is in a first state; or comparing the contents of the first register to contents of a non-register location if the bit is in a second state; and
    skipping a subsequent instruction based on results of the comparison.

11. The method of claim 10 wherein skipping the subsequent instruction comprises replacing the subsequent instruction with a no operation instruction.

12. The method of claim 10 wherein the non-register location is a location selected from the group consisting of memory and a stack.

13. A system, comprising:
    a main processor unit; and
    a co-processor coupled to said main processor unit, wherein said co-processor executes a test and skip instruction when called within a sequence of instructions that includes a first register reference and a second register reference and causes the processor to compare a first value comprising a register value stored in a register corresponding to the first register reference and a second value associated with the second register reference and to execute or not execute a subsequent instruction that follows the test and skip instruction based on the comparison.

14. The system of claim 13 wherein the second value comprises a register value stored in the second register reference.

15. The system of claim 13 wherein the processor is configured to access memory and the second value is stored in the memory.

16. The system of claim 15 wherein the second register reference contains a value used to compute a pointer to a memory location containing the second value.

17. The system of claim 16 wherein the pointer is computed by adding the value from the second register reference to a register value from another register.

18. The system of claim 13 wherein the comparison includes a condition that is specified in the test and skip instruction.

19. The system of claim 18 wherein any one of a plurality of conditions are specified in the test and skip instruction.

20. The system of claim 18 wherein the condition is a condition selected from the group consisting of equal to, not equal to, less than, and greater than.

21. The system of claim 13 wherein the system comprises a communication device.

22. A programmable logic device comprising;
    control logic; and
    a means for executing a test and skip instruction when called within a sequence of instructions that includes a first register reference identifying a first register having a register value and a second register reference identifying a second register also having a register value, for comparing a first value comprising the register value stored in the first register and a second value associated with the second register, and for executing or not executing a subsequent instruction that follows the test and skip instruction based on the comparison.

23. The programmable logic device of claim 22 wherein said second value is stored in a register.

24. The programmable logic device of claim 22 wherein said second value is stored in memory.

25. The programmable logic device of claim 22 wherein said second value is stored in a stack.

\* \* \* \* \*